(12) United States Patent
Shelley et al.

(10) Patent No.: US 6,797,958 B2
(45) Date of Patent: Sep. 28, 2004

(54) METHOD OF MEASURING SOL-GEL COATING THICKNESS USING INFRARED ABSORBANCE

(75) Inventors: Paul H. Shelley, Lakewood, WA (US); Richard G. Wire, Bonney Lake, WA (US); Terry C. Tomt, Enumclaw, WA (US)

(73) Assignee: The Boeing Company, Chicago, IL (US)

(*) Notice: Subject to any disclaimer, the term of this patent is extended or adjusted under 35 U.S.C. 154(b) by 128 days.

(21) Appl. No.: 10/171,870

(22) Filed: Jun. 13, 2002

(65) Prior Publication Data

US 2003/0230719 A1 Dec. 18, 2003

(51) Int. Cl.$^7$ .............................................. G01N 21/35
(52) U.S. Cl. .............................. 250/341.8; 250/341.1
(58) Field of Search ....................... 250/341.8, 341.1, 250/338.1, 339.01

(56) References Cited

U.S. PATENT DOCUMENTS

| | | |
|---|---|---|
| 3,017,512 A | 1/1962 | Wolbert |
| 3,973,122 A | 8/1976 | Goldberg |
| 3,994,586 A | 11/1976 | Sharkins et al. |
| 4,015,127 A * | 3/1977 | Sharkins ..................... 250/341 |
| 4,549,079 A | 10/1985 | Terasaka et al. |
| 4,791,296 A | 12/1988 | Carpio |
| 4,800,279 A | 1/1989 | Hieftje et al. |
| 5,015,856 A | 5/1991 | Gold |
| 5,381,228 A | 1/1995 | Brace |
| 6,052,191 A | 4/2000 | Brayden, Jr. et al. |

FOREIGN PATENT DOCUMENTS

| | | |
|---|---|---|
| DE | 2252527 | 10/1972 |
| DE | 2252527 | 5/1974 |
| WO | WO 0192820 | 12/2001 |

OTHER PUBLICATIONS

Kumar, C. Siva et al., "Studies on anodic oxide coating with low absorptance and high emittance on aluminum alloy 2024", Solar Energy Material & Solar Cells 60 (2000) p. 51–87, Received Feb. 22, 1999, received in revised form Apr. 12, 1999, accepted Jun. 1, 1999, www.elsevier.com.

Kumar, C. Siva et al., "Studies on white anodizing on aluminum alloy for space applications", Applied Surface Science 151 (1999) p. 280–286, Received Mar. 20, 1999, accepted May 31, 1999, www.elsevier.nl/locate/apsusc.

* cited by examiner

*Primary Examiner*—Constantine Hannaher
*Assistant Examiner*—Timothy Moran
(74) *Attorney, Agent, or Firm*—Black Lowe & Graham PLLC; Mark S. Beaufait

(57) ABSTRACT

A nondestructive method is provided for efficiently determining thickness of a sol-gel coating formed upon a metallic substrate. A value of infrared energy reflected from the metallic substrate without the sol-gel coating is determined. A value of infrared energy reflected from the metallic substrate with the sol-gel coating is determined. A value of infrared energy absorbed in the sol-gel coating is determined, and a value of the infrared energy absorbed in the sol-gel coating is correlated to a thickness of the sol-gel coating.

22 Claims, 3 Drawing Sheets

US 6,797,958 B2

METHOD OF MEASURING SOL-GEL COATING THICKNESS USING INFRARED ABSORBANCE

RELATED APPLICATIONS

This patent application is related to a concurrently-filed patent application entitled "Method of Measuring Anodize Coating Amount Using Infrared Absorbance" and bearing attorney docket number BOEI-1-1049 and to a concurrently-filed patent application entitled "Method of Measuring Chromated Conversion Coating Amount Using Infrared Absorbance" and bearing attorney docket number BOEI-1-1060, both of which are hereby incorporated by reference.

FIELD OF THE INVENTION

This invention relates generally to measuring coating thickness and, more specifically to measuring coating thickness on metal surfaces.

BACKGROUND OF THE INVENTION

Sol-gel coatings are created upon metallic substrates for a great variety of purposes. For example, titanium foil is frequently covered with a sol-gel coating when forming laminate structures where the sol-gel promotes adhesion of the various layers in the structure. Sol-gel coatings are generally made using wet chemistry methods where the liquid sol-gel mixture is created and optimized prior to applying it to the metal substrate. The sol-gel is typically applied by spraying the sol-gel on the metal surface. The sol-gel is then cured at elevated temperature to give the desired properties.

Generally, a uniform coating thickness or a coating thickness within an acceptable range is desired. However, determining uniformity of the coating thickness or quantifying the coating thickness relative to a desired range may be difficult. Current coating thickness testing methods are destructive and therefore cannot be used with final production products. They are also time consuming, environmentally unfriendly, and disruptive to large scale production processes. Sol-gel coating thickness is sometimes specified for some applications and there is no simple non-destructive for measurement of sol-gel thickness currently known in the art.

Current coating thickness testing known in the art is performed by sputtering away the sol-gel coating using depth profiling Auger spectroscopy or Glow Discharge Optical Emission Spectroscopy (GD-OES). These methods gradually remove the sol-gel coating and can determine where the sol-gel ends and the metal substrate begins. Sol-gel thickness is measured by calibrating the sol-gel removal rate and measuring the time required to remove the sol-gel layer. In addition, the currently known testing methods make very small measured spots for coating thickness on the sample. As such, the currently known testing processes require many time-consuming measured spots to determine coating thickness variations over an area.

Therefore, there exists an unmet need in the art for a nondestructive method of determining sol-gel coating thickness on a metallic substrate.

SUMMARY OF THE INVENTION

The present invention provides a nondestructive method for efficiently determining thickness of a sol-gel coating formed upon a metallic substrate without sputtering away the sol-gel coating. The invention may be employed in an in-line production facility or may be used intermittently as desired. The process may be used to provide a quantitative measurement, such as actual coating thickness, or a qualitative measurement, such as a go or no-go result.

According to one embodiment of the invention, a non-destructive method is provided for determining the thickness of a sol-gel coating on a metallic substrate. A value of infrared energy reflected from the metallic substrate without the sol-gel coating is determined. A value of infrared energy reflected from the metallic substrate with the sol-gel coating is determined. A value of infrared energy absorbed in the sol-gel coating is determined, and a value of the infrared energy absorbed in the sol-gel coating is correlated to a thickness of the sol-gel coating.

According to an aspect of the invention, one embodiment of the invention includes transmitting an infrared beam having a predetermined wavelength through a sol-gel coating on a metallic substrate at a predetermined incident beam angle. The transmitted beam has a cross-sectioned area to produce a predetermined spot size on a surface of the sol-gel coating. The infrared beam is reflected off the metallic substrate to form a reflected beam and the reflected beam is filtered to a predetermined wavelength band, if desired, and detected. The infrared energy of the reflected beam is compared with a predetermined value of infrared energy reflected off the metallic substrate without the sol-gel coating to determine an absorbance value for the sol-gel coating. The absorbance value for the sol-gel coating is correlated to a thickness of the sol-gel coating.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
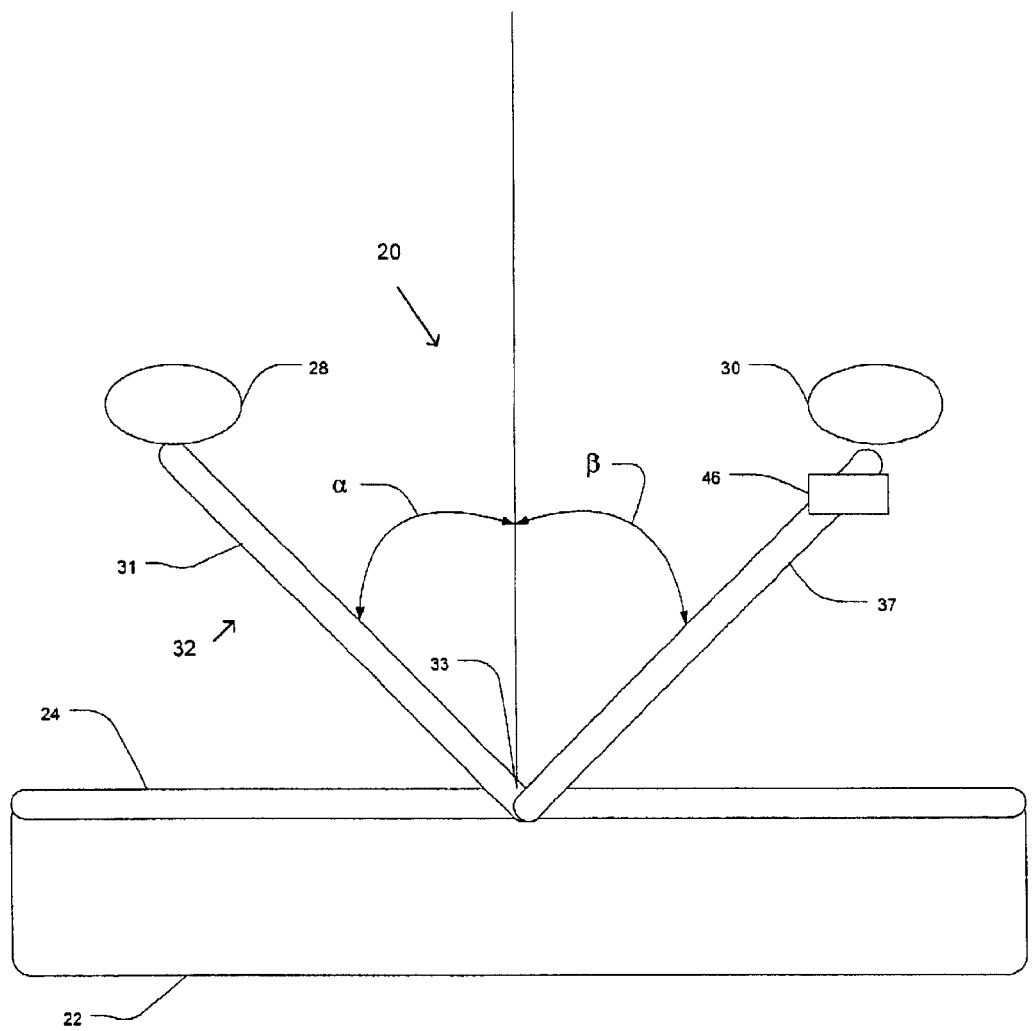
FIG. 1 is a side view of a testing setup according to the present invention.

The present invention provides a method for nondestructively determining a thickness of a sol-gel coating that has been formed on a metallic substrate by calibrating the infrared absorbance of the coating, at a specific wavelength, to the coating thickness. By way of overview and with reference to FIGS. 1 and 2, one presently preferred embodiment of the present invention determines sol-gel coating thickness using a testing setup 20. Initially, a base reference value of infrared energy reflected by an uncoated metallic substrate is determined. An infrared transmission beam 31 is transmitted from an infrared source 28 along a predetermined incident beam path 32 through a sol-gel coating 24. The infrared beam 31 is transmitted in such a fashion to form a spot 33 having a predetermined size on the surface of the coating 24. The transmission beam 31 is reflected off a metallic substrate 22 to form a reflected beam 37. The reflected beam 37 is passed through the coating 24 and is detected by an infrared detector 30. A comparison is made of the infrared energy of the reflected beam and the infrared energy of the base reference value to determine a coating absorbance value. The coating absorbance value is correlated to a sol-gel coating thickness. Specific details of the testing setup 20 are described with more particularity below.

In one presently preferred embodiment, the metallic substrate 22 is a 2024-T3 bare aluminum alloy. However, other metallic substrates are considered within the scope of this invention, such as, without limitation, 2024-T3 clad aluminum alloy, titanium alloys such as 15-333 and 6-4, and 7075-T6 bare aluminum allow. Additionally, it will be appreciated that other aluminum, titanium, or metal alloys may be used without departing from the spirit of the invention.

In a presently preferred embodiment, the testing setup 20 is a simple infrared filter system, including an infrared generator, transmitter, reflection optics, band pass filter and detector. A non-limiting example of a simple infrared filter system is a Coating Weight Reader produced by Personal Instruments. However, it will be appreciated that other infrared systems are employable with the testing setup 20, such as, without limitation, standard infrared spectrometers and infrared imaging systems. Non-limiting examples of standard infrared spectrometers include a Thermo Nicolet 760 FT-IR spectrometer system fitted with a Harrick Refractor® grazing angle reflectance accessory. The Thermo Nicolet FT-IR system provides the source and detector while the Refractor® provides the appropriate reflection angle, spot size and polarizer. Another example is a Surface Optics Corporation SOC400 portable FT-IR spectrometer with a grazing angle reflectance attachment. Non-limiting examples of infrared imaging systems employable with the present invention include ImageMax® produced by Nicolet. It will be appreciated that the various infrared systems may include those configured to be used as an in-line production element or may include a portable, hand-held arrangement.

The infrared beam 31 is suitably transmitted as a broadband mid-infrared light beam (about 2.5 microns to about 25 microns). In a preferred embodiment, the reflected beam 31 is suitably filtered by a filter 46 at a preferred wavelength band with a center wavelength of approximately 9.2 microns ($\mu$m). The filter 46 may act on either the transmitted beam 31 or the reflected beam. It will be appreciated, however, that the optimal wavelength may deviate from the preferred wavelength depending on the process employed to form the sol-gel coating 24. A wavelength within a range from about 8.9 $\mu$m to about 9.5 $\mu$m has been found to provide acceptable infrared absorbance characteristics and is to be considered within the scope of this invention. Further, it will be appreciated that, when using either the standard infrared spectrometer or infrared imaging systems, the filter 46 may suitably be implemented by either hardware or software performing the filtering function. When the detected infrared beam 31 has a wavelength band within this disclosed range, a substantially linear relationship has been found to exist between infrared absorbance and the sol-gel coating thickness, as discussed in more detail below.

The broadband infrared beam 31 is generated by the infrared source 28. The infrared source 28 is any acceptable source of infrared energy known in the art that can produce the infrared beam 31 having the desired wavelength region. One suitable example of a preferred embodiment of the infrared source is the ReflectIR-PIN source made by Ion Optics.

The infrared detector 30 in the filtered systems described here is suitably arranged to detect the reflected beam 37. One suitable example of a preferred embodiment of the infrared detector 30 is the Eltec Corp 406MAY-XXX where XXX indicates the filter that is used with the detector.

The infrared beam 31 defines the spot 33 on the surface of the sol-gel coating 24. The size of the spot 33 is predetermined by use of a mask and/or focusing optics in communication with the infrared source 28. In a presently preferred embodiment, the size of the spot 33 is preferably within a range of about 2 mm to about 35 mm in diameter. In one embodiment, the spot 33 is preferably an oval shape that is about 12.7 mm by about 25 mm. However, a size of the spot 33 that is either above or below the preferred range is considered within the scope of this invention.

The incident beam path 31 is directed such that the incident beam angle $\alpha$ is within a desired range. In one embodiment, the incident beam angle $\alpha$, relative to normal, is preferably about 70 degrees to about 80 degrees. In a particular embodiment, the incident beam angle $\alpha$ is preferably about 75 degrees. A reflected beam angle $\beta$ equals the incident beam angle $\alpha$. As a result, the reflected beam angle $\beta$ is preferably within a range of about 70 degrees to about 80 degrees from normal. In one presently preferred embodiment, the reflected beam angle $\beta$ is preferably about 75 degrees.

If desired, a polarizer 47 may be employed to improve the absorbance measurement. In a preferred embodiment, the polarizer 47 limits a measured reference value of infrared energy reflected by an uncoated metallic substrate to only the portion of the infrared beam that interacts with the coating at reflection angles of 70 degrees or more. The polarizer 47 is suitably configured to pass light that is polarized in or nearly in the incident plane of the measurement. This is because light in the incident plane is strongly absorbed by the sol-gel coating 24 with reflection angles of 70 degrees or more. However, it will be appreciated that this measurement may be performed without the polarizer 47, if desired, because the polarizer 47 improves the measurement of the absorbance values and is not critical to the ability to be able to make the measurement.

Figure 2:
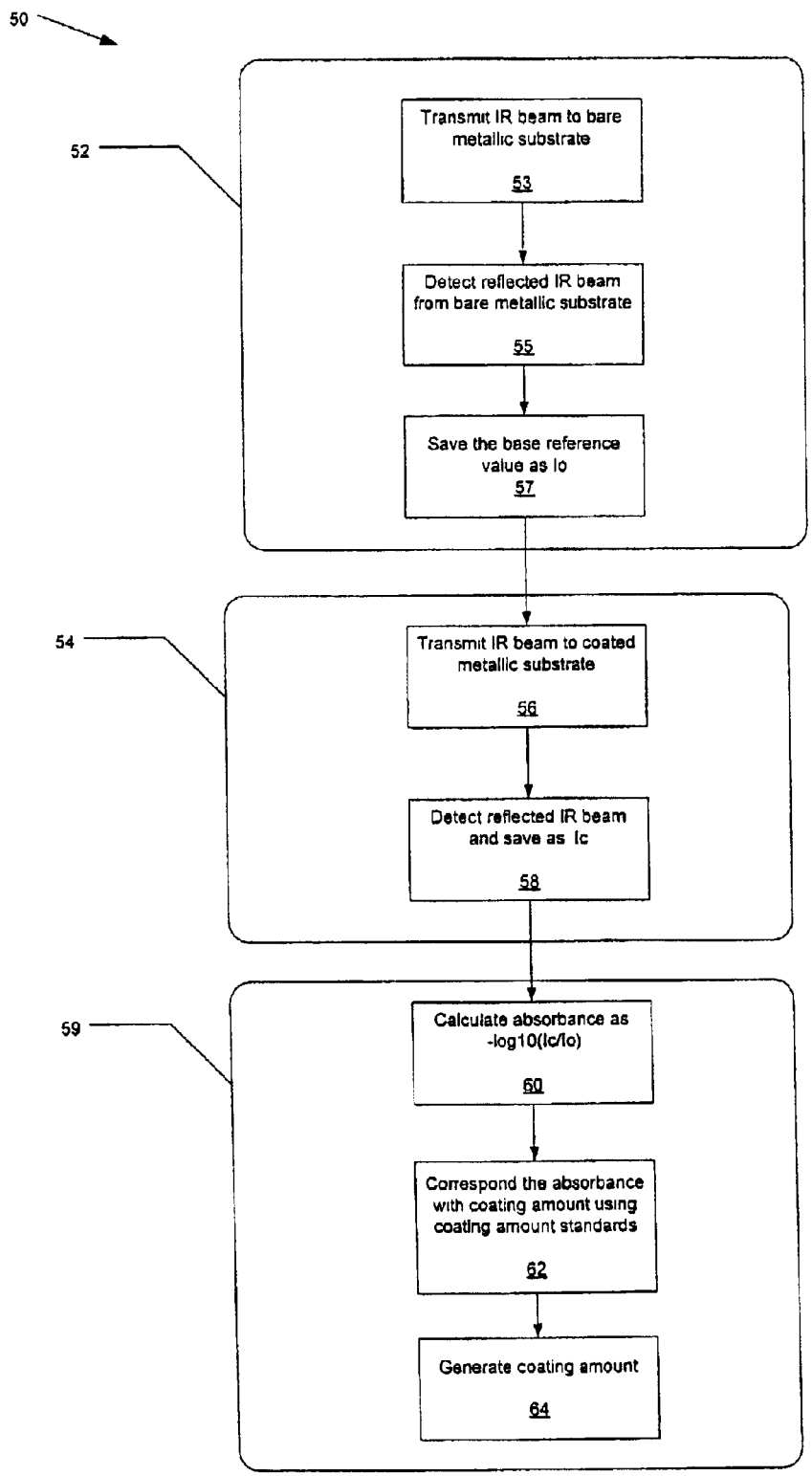
FIG. 2 is a flow chart of the testing process.

Referring now to FIGS. 1 and 2, a process 50 for determining thickness of a sol-gel coating is illustrated. This process is substantially the same for a filtered infrared beam system, a standard infrared spectrometer system, or infrared imaging systems. An infrared energy base reference value $I_o$ is determined at block 52 for a non-coated metallic substrate of the same material to be tested. At a block 53, the infrared beam 31 is transmitted along the incident beam path 31. At a block 55, the reflected beam 37, at a specific wavelength, is detected to yield the base reference value $I_o$. At a block 57 the reference energy value is saved as $I_o$.

After determining the base reference value $I_o$, data collection on material with the sol-gel coating begins at a block 54. As discussed above, the transmission beam 31 is directed through the sol-gel coating 24 at a block 56 and is reflected off the metal substrate 22 to form the reflected beam 37. The reflected beam 37 is detected at a block 58 and this value is saved as infrared energy $I_c$ of the reflected beam. It will be appreciated that parameters such as incident beam angle $\alpha$, size of the spot 33, and overall incident beam path length are maintained substantially similar in both reference value determination and the coating thickness absorbance value determination to limit potential errors.

A data calculation and compilation occurs at a block 59. The data compilation process includes calculation of the absorbance value of the coating a block 60 using the formula absorbance $I_a = -\log_{10}(I_c/I_o)$. The absorbance values can be measured directly with infrared spectrometers (and imaging spectrometers) by measuring the absorbance peak height at the appropriate location (about 9.2 um) in the infrared spectrum. The compilation and calculation is suitably performed in a number of acceptable manners. For example, in one embodiment, it is performed by a processor or microprocessor (not shown) arranged to perform mathematical operations. Any processor known in the art is acceptable, without limitation, a Pentium®-series processor available from Intel Corporation, or the like. The processor is suitably included within the infrared spectrometer and is also suitably provided as a stand-alone unit that is electrically connected to receive data from the infrared detector 30. Alternately, the calculation is performed by an electronic computer chip or is performed manually. The results of the calculation yield an absorbance value that corresponds to a sol-gel coating thickness at a block 62.

The absorbance measurement is repeated for several metal coupons with sol-gel coatings that are made as standards for the particular metal substrate and sol-gel coating to be tested. These standards have different coating amounts that are made by controlling the sol-gel application process. Higher thickness (or coating weight) is suitably generated by any of several methods, including changing the as-applied chemical concentration and/or additional applications of sol-gel solution after the prior film is cured. The thickness for each of the standards is found by sputtering away the sol-gel in a small spot and measuring where the sol-gel stops and the metal substrate begins. Coating weight is calculated as the difference between the bare substrate before coating it and the cured coating on the same substrate. This thickness in angstroms is calculated for each one. At a block 64, the sol-gel coating thickness is generated. More specifically, a calibration is calculated for the sol-gel coating by doing a plot or linear regression of the coating thickness values versus the absorbance values. This calibration can then be used to correlate coating thickness directly from absorbance values for sol-gel coatings on metal surfaces.

Figure 3:
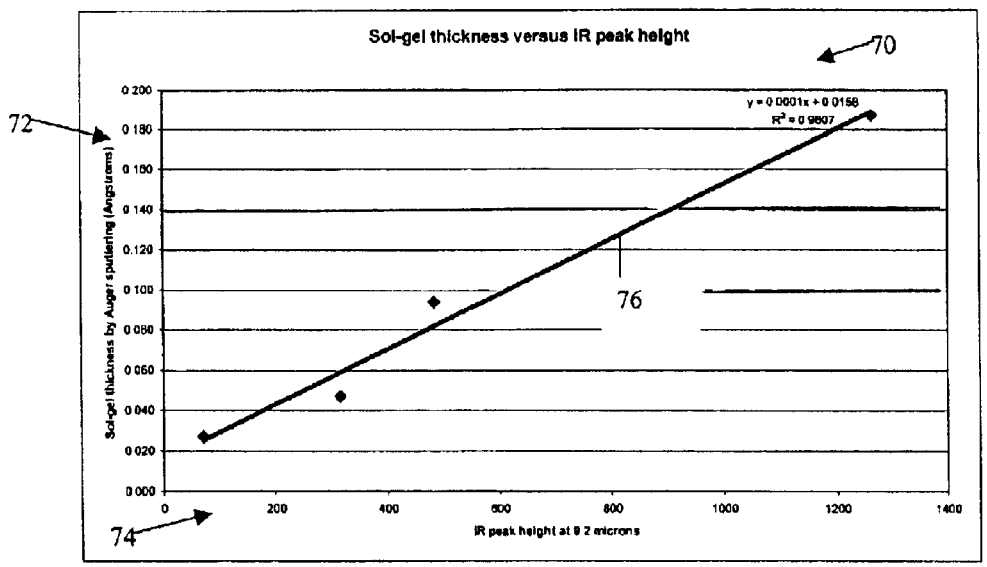
FIG. 3 is a graphical illustration of the relation between coating thickness and infrared absorbance in accordance with the present invention.
Figure 4:
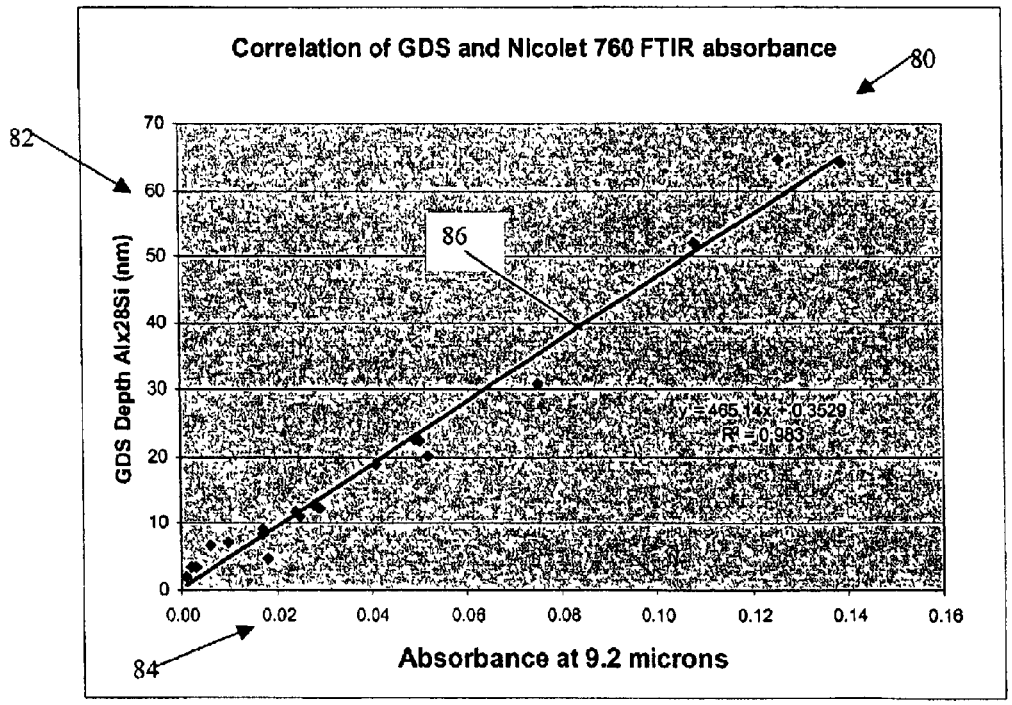
FIG. 4 is another graphical illustration of the relation between coating thickness and infrared absorbance in accordance with the present invention.

FIGS. 3 and 4 depict the resulting test data illustrating the substantially linear relationship between the sol-gel coating thickness and the infrared absorbance at the preferred wavelength. It will be appreciated that FIGS. 3 and 4 represent experimental data generated by different infrared spectrometer devices. However, each trial was performed by the process of the present invention. It will also be appreciated that prior to testing, both processes included making a base line determination.

FIG. 3 shows a graph 70 of thickness of sol-gel coating along a vertical axis 72 versus infrared absorbance (IR peak height) at a wavelength of 9.2 microns along a horizontal axis 74. The sol-gel thickness was measured by Auger depth profiling spectroscopy for FIG. 3. The corresponding relationship between thickness of sol-gel coating and infrared absorbance yields a substantially linear line 76 at 9.2 microns.

Experimental data displayed in FIGS. 3 and 4 were collected using industry standard infrared spectrometry equipment. More specifically, initial testing employed a Thermo Nicolet 760 spectrometer, fitted with a Harrick Refractor® grazing angle reflectance accessory having a 75 degree reflection geometry. The Refractor® has an internal polarizer and measures an oval spot that is approximately 12.7 mm by 25 mm. The spectrometer system was set up with a mercury cadmium telluride (MCT) detector, four-wave number resolution, sixty-four scans for sample and reference, and a 2.5 to 25 micron wavelength spectral range. Each coupon was measured from t and back in the center of the coupon.

FIG. 4 shows a graph 80 of thickness of sol-gel coating along a vertical axis 82 versus infrared absorbance at a wavelength of 8.9 microns along a horizontal axis 84. The corresponding relationship between thickness of sol-gel coating and infrared absorbance yields a substantially linear line 86. FIG. 4 uses sol-gel thicknesses measured by DG-OES spectroscopy.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A non-destructive method of determining a thickness of sol-gel coating on a metallic substrate, the method comprising:

non-destructively determining a value $I_a$ of infrared energy absorbed at a predetermined wavelength within a range of about 2.5 microns to about 25 microns in a sol-gel coating on a metallic substrate; and correlating the value $I_a$ of the infrared energy absorbed in the sol-gel coating to a thickness of the sol-gel coating.

2. The method of claim 1, further comprising:

determining a value $I_c$, of infrared energy reflected from the metallic substrate without the sol-gel coating.

3. The method of claim 2, further comprising:

determining a value $I_c$ of infrared energy reflected from the metallic substrate having the sol-gel coating.

4. The method of claim 3, wherein non-destructively determining the infrared energy absorbed in the sol-gel coating is calculated according to the equation $$I_a = -\log_{10}(I_c/I_o).$$

5. The method of claim 1, wherein determining the value $I_a$ is performed during on-line manufacturing processing of the metallic substrate.

6. A non-destructive method of determining a thickness of a sol-gel coating on a metallic substrate, the method comprising:

transmitting an infrared beam having a predetermined wavelength within a range of about 2.5 microns to about 25 microns through a sol-gel coating on a metallic substrate at a predetermined incident beam angle relative to normal, the transmitted beam having a cross-sectional area to produce a predetermined spot size on a surface of the sol-gel coating;

reflecting the infrared beam off the metallic substrate to form a reflected beam;

detecting the reflected beam;

comparing infrared energy $I_c$ of the reflected beam with a predetermined value of infrared energy $I_o$ reflected off the metallic substrate without the sol-gel coating to determine absorbance value $I_a$ for the sol-gel coating; and correlating the absorbance value $I_a$ for the sol-gel coating to a sol-gel coating thickness.

7. The method of claim 6, wherein the predetermined spot size is in a range from about 2 mm to about 35 mm.

8. The method of claim 7, wherein the predetermined spot size is an oval of about 12.7 mm by about 25 mm.

9. The method of claim 6, wherein the predetermined incident beam angle is in a range from about 70 degrees to about 80 degrees from normal.

10. The method of claim 9, wherein the predetermined incident beam angle is about 75 degrees from normal.

11. The method of claim 6, wherein the metallic substrate includes one of an aluminum alloy and a titanium alloy.

12. The method of claim 11, wherein the one of an aluminum alloy and a titanium alloy includes at least one of a 2024 aluminum alloy, a 7075 aluminum alloy, a 15-333 titanium alloy, and a 6-4 titanium alloy.

13. The method of claim 6, wherein detecting the reflected beam is performed with an infrared spectrometer system.

14. The method of claim 6, wherein detecting the reflected beam is performed with an infrared filter system.

15. The method of claim 6, wherein detecting the reflected beam is performed with an infrared imaging system.

16. The method of claim 6, wherein the predetermined wavelength is about 9.2 microns.

17. The method of claim 6, wherein the absorbance value $I_a$ is calculated according to the equation $$I_a = -\log_{10}(I_c/I_o).$$

18. A non-destructive method of determining a thickness of sol-gel coating on a metallic substrate, the method comprising:

transmitting an infrared beam having a predetermined wavelength within a range of about 2.5 microns to about 25 microns through a sol-gel coating on a metallic substrate at a predetermined incident beam angle in a range from about 70 degrees to about 80 degrees from normal, the transmitted beam having a cross-sectional area to produce a predetermined spot size in a range from about 2 mm to about 35 mm on a surface of the sol-gel coating;

reflecting the infrared beam off the metallic substrate to form a reflected beam;

detecting the reflected beam;

comparing infrared energy $I_c$ of the reflected beam with a predetermined value of infrared energy $I_o$ reflected off the metallic substrate without the sol-gel coating to determine an absorbance value $I_a$ for the sol-gel coating; and correlating the absorbance value $I_a$ for the sol-gel coating to a sol-gel coating thickness.

19. The method of claim 18, wherein the absorbance value $I_a$ is calculated according to the equation $$I_a = -\log_{10}(I_c/I_o).$$

20. The method of claim 18, wherein the predetermined spot size is an oval of about 12.7 mm by about 25 mm.

21. The method of claim 18, wherein the predetermined incident beam angle is about 75 degrees from normal.

22. The method of claim 18, wherein the predetermined wavelength is about 9.2 microns.

* * * * *